United States Patent [19]
Yamagishi

[11] Patent Number: 5,907,373
[45] Date of Patent: May 25, 1999

[54] PROJECTION TYPE COLOR IMAGE DISPLAY DEVICE

[75] Inventor: Shigekazu Yamagishi, Takatsuki, Japan

[73] Assignee: Matsushita Electric Industrial Co., Ltd., Osaka, Japan

[21] Appl. No.: 08/654,531

[22] Filed: May 29, 1996

[30] Foreign Application Priority Data

Jun. 2, 1995 [JP] Japan ................................ 7-136469

[51] Int. Cl.⁶ .................................................. H04N 9/97
[52] U.S. Cl. ........................ 348/744; 348/756; 348/757; 348/779; 348/780
[58] Field of Search .................................. 348/744, 756, 348/757, 779–785; 359/651, 639, 629; H04N 9/97, 9/31

[56] References Cited

U.S. PATENT DOCUMENTS

| | | | |
|---|---|---|---|
| 2,792,740 | 5/1957 | Haynes. | |
| 4,827,334 | 5/1989 | John et al. | 348/756 |
| 4,864,390 | 9/1989 | McKechnie et al. | 348/756 |
| 4,888,614 | 12/1989 | Suzuki et al. | 355/43 |
| 4,968,874 | 11/1990 | Kasuga | 250/201.5 |
| 4,995,709 | 2/1991 | Iwata et al. | 350/447 |
| 5,231,431 | 7/1993 | Yano et al. | 353/31 |
| 5,305,146 | 4/1994 | Nakagaki et al. | 359/634 |
| 5,442,284 | 8/1995 | Shikawa | 359/651 |
| 5,621,550 | 4/1997 | Oku. | |
| 5,638,142 | 6/1997 | Kavanagh et al. | 348/756 |

FOREIGN PATENT DOCUMENTS

| | | |
|---|---|---|
| 0 337 555 | 10/1989 | European Pat. Off. . |
| 0 465 171 | 1/1992 | European Pat. Off. . |
| 0 469575 | 2/1992 | European Pat. Off. . |
| 0 602 732 | 6/1994 | European Pat. Off. . |
| 5-313119 | 11/1993 | Japan . |
| 08054623 | 2/1996 | Japan . |
| 93/11452 | 6/1993 | WIPO . |
| 95/12286 | 5/1995 | WIPO . |

*Primary Examiner*—Brian L. Casler
*Assistant Examiner*—Luanne P. Din
*Attorney, Agent, or Firm*—Ratner & Prestia

[57] ABSTRACT

In a projection type image display device for combining an image by dichroic mirrors in a form of parallel plane plate, a projected image of high picture quality is presented by suppressing the astigmatism. In a projection type image display device comprising a light source for emitting blue light, green light, and red light, liquid crystal panels for modulating individual color lights, dichroic mirrors for combining the modulated lights, dichroic mirrors for combining the modulated lights, and a projection lens for projecting the combined light, the dichroic mirrors are disposed obliquely on a first plane including an optical axis linking the projection lens and liquid crystal panels, and a parallel plane plate for correcting astigmatism is disposed obliquely on a second plane orthogonal to the first plane. In particular, preferably, the thickness of the parallel plane plate for correcting the astigmatism should be greater than the thickness of the dichroic mirrors, and the light incident angle into the parallel plane plate for correcting the astigmatism should be smaller than the light incident angle to the dichroic mirrors.

14 Claims, 3 Drawing Sheets

PROJECTION TYPE COLOR IMAGE DISPLAY DEVICE

BACKGROUND OF THE INVENTION

The present invention relates to a projection type color image display device for combining an image on an image display device by a dichroic mirror, and projecting by a projection lens.

Previously, a projection type color image display device for obtaining a picture by projection lenses provided before cathode ray tubes (CRT) for displaying blue, green and red images has been proposed. On the other hand, a projection type color image display device comprising one projection lens has been also proposed. For example, a conventional projection type color image display device is shown in FIG. 4. In FIG. 4, the conventional projection type color image display device is composed of three liquid crystal panels with transmission type and one projection lens. The light emitted from a light source 101 is reflected by a reflector 102, and is separated into blue light, green light and red light respectively, by a first light-separating dichroic mirror 103, a second light-separating dichroic mirror 104, and a first reflecting mirror 105.

The separated lights are provided to a first liquid crystal panel with transmission type 106a, a second light crystal panel with transmission type 106b, and a third liquid crystal panel with transmission type 106c. In each liquid crystal panel, each color-light is modulated into light having an image. The color-lights modulated by the liquid crystal panels are combined by a first color-light-combining dichroic mirror 107, a second color-light-combining dichroic mirror 108, and a second reflecting mirror 109. The first color-light-combining dichroic mirror 107 and second color-light-combining dichroic mirror 108 are plates having parallel planes.

The combined color-light is magnified and projected by a projection lens 110, and a color picture is displayed on a screen 120.

In such a device, however, as the picture elements of the liquid crystal panel are advanced in definition, the picture quality deteriorates significantly. This is caused by the astigmatism occurring in the image of the color-light transmitted through the first color-light-combining dichroic mirror 107 and the image of the color-light passing through the second color-light-combining dichroic mirror 108, thereby extremely impairing the picture quality.

Since the first color-light-combining dichroic mirror 107 and second color-light-combining dichroic mirror 108 are disposed obliquely to the optical axis linking the liquid crystal panel and projection lens, such astigmatism occurs. FIG. 5 is a magnified view of essential parts of FIG. 4, and explains the onset mechanism of astigmatism. In FIG. 5, supposing the thickness of the first color-light-combining dichroic mirror 107 to be T, the refractive index of the substrate of the first color-light-combining dichroic mirror 107 to be N, the incident angle of the light transmitted through the first color-light-combining dichroic mirror 107 into the first color-light-combining dichroic mirror 107 to be $X_1$, and the angle of approach in the first color-light-combining dichroic mirror 107 to be $X_2$, the astigmatism Y is expressed in formula (1).

$$Y = \frac{T(1 - \cos^2 X_1 / \cos^2 X_2)}{N \cdot \cos X_2} \quad (1)$$

From formula (1), the smaller the thickness of the first color-light-combining dichroic mirror 107, the smaller the value of astigmatism, but the thickness of the first color-light-combining dichroic mirror 107 cannot be reduced due to the following reasons.

If the first color-light-combining dichroic mirror 107 is thin, the shape may be deformed due to external force when assembling the first-color-combining dichroic mirror 107 into a support mechanism component (not shown), and the stress at this time causes the shape to change gradually. The first color-light-combining dichroic mirror 107 is composed by applying a dichroic coat on the substrate, but if the thickness is small, the substrate may be deformed by the heat in the process of applying the dichroic coat.

The first color-light-combining dichroic mirror 107 has the functions of transmitting the image-light from the first liquid crystal panel with transmission type 106a, and also reflecting the image-light from the second liquid crystal panel with transmission type 106b. Therefore, when reflecting the image-light from the second liquid crystal panel with transmission type 106b, in order that the reflected image may not be distorted, the surface of the first color-light-combining dichroic mirror 107 is demanded to have a flatness of high precision.

As for the second color-light-combining dichroic mirror 108, too, the thickness cannot be reduced due to the same reasons as in the first color-light-combining dichroic mirror 107.

As explained herein, it is impossible to reduce the thickness of the color-light-combining dichroic mirror, and the thickness of the color-light-combining dichroic mirror is large, thereby resulting in large astigmatism.

Due to the astigmatism, a deviation occurs between the focusing position of the projected image in the longitudinal direction and the focusing position in the lateral direction. Therefore, the longitudinal line and the lateral line cannot be focused at the same time. As a result, a clear image cannot be obtained, and only a blurry image is produced.

In FIG. 4, the image modulated only by the third liquid crystal panel with transmission type 106c, out of the first liquid crystal panel with transmission type 106a, second liquid crystal panel with transmission type 106b, and third liquid crystal panel with transmission type 106c, is led into the screen through reflection by the second reflecting mirror 109 and second color-light-combining dichroic mirror 108 only, so that astigmatism does not occur.

However, the image modulated by the second liquid crystal panel with transmission type 106b is transmitted through the second color-light-combining dichroic mirror 108, resulting in astigmatism. The image modulated by the first liquid crystal panel with transmission type 106a is transmitted through the first color-light-combining dichroic mirror 107 and second color-light-combining dichroic mirror 108, resulting in astigmatism. Therefore, when combining the images by projection of these images and adjusting the convergence, the multiplying factor in the longitudinal direction is different from the multiplying factor in the lateral direction owing to the presence of astigmatism. Consequently, the aspect ratio of the projected image varies depending on the value of astigmatism. As a result, it is difficult to match mutually the images projected by the three modulating means, that is, the first liquid crystal panel with transmission type 106a, second liquid crystal panel with transmission type 106b, and third liquid crystal panel with transmission type 106c, and a color image having color blurring at end portions is obtained, and a clear image cannot be reproduced.

In this way, when the light passes through the parallel plane plates disposed obliquely on the optical path, the optical axis on the optical path is included, and the focusing position on the first plane along the incident light and transmitted light includes its optical axis, and hence a position deviation to the focusing position on the second plane orthogonal to the first plane occurs, so that astigmatism occurs.

To solve such problems of color blurring and clouding in the projected image caused by astigmatism, a projection type image display device using color combining dichroic mirrors of a wedge shape is proposed. Generally, however, the dichroic mirrors for color-light-combination must have a high surface precision and precise spectral characteristic. Therefore, machining the color-light-combining dichroic mirrors into a wedge shape has a low yield of processing and has a very high manufacturing cost because the shape is complicated.

Besides, the dichroic mirrors for color-light-combination are composed by applying a dichroic coat on the substrate, and the substrate is exposed to high temperature when applying the dichroic coat on the substrate, which requires the use of substrates that can withstand high temperature, such as glass and ceramics. Using such glass or ceramics, machining of dichroic mirrors into a wedge shape requires a further higher cost.

On the other hand, to decrease astigmatism, it is proposed to place a parallel plane plate of glass for correcting astigmatism at a position of distortion to the color-light-combining dichroic mirror, and at a position having the same light incident angle as the color-light-combining dichroic mirror. In such a constitution, however, since the astigmatism correcting glass must be placed at a position of distortion to the color-light-combining dichroic mirror, it requires a wide space. Hence, the size of the assembled projection type image display device is large depending on the angle of distortion. For the material, glass is needed, and the glass processing cost is high.

SUMMARY OF THE INVENTION

A projection type image display device of the invention comprises:
  a light source,
  light-separating means (means for separating light),
  a plurality of light-modulating means (a plurality of means for light),
  a first color-light-combining means (first means for combining color light),
  a second color-light-combining means (second means for combining color light),
  a astigmatism-correcting means (means for correcting astigmatism), and
  a light-projecting means (means for projecting light).

The light source comprises a first color-light, a second color-light, and a third-color light.

The light-separating means is disposed between the light source and the plurality of light-modulating means, and separates the light from the light source into a first color-light, a second color-light, and a third color-light.

The plurality of light-modulating means contain first light-modulating means for modulating the first color-light into a first image-light, second light-modulating means for modulating the second color-light into a second image-light, and third light-modulating means for modulating the third color-light into a third image-light.

The first color-light-combining means is disposed between the first modulating means and light-projecting means, obliquely to the optical axis linking the projecting means and first light-modulating means, being a plate having parallel planes with thickness of 't1', possessing characteristics of passing the first color-light and reflecting the other color-lights.

The second color-light-combining means is disposed between the third modulating means and light-projecting means, obliquely to the optical axis, being a plate having parallel planes with thickness of 't2', possessing characteristics of transmitting the first color-light and second color-light and reflecting the other color-light.

The first color-light-combining means and second color-light-means are disposed on the first plane including the optical axis linking the projecting means and first light modulating means, obliquely at a light incident angle of 'a' to the first plane.

The astigmatism-correcting means is disposed on a second plane including the optical axis orthogonal to the first plane, between the first color-light-combining means and second color-light-combining means, obliquely at a light incident angle of 'b' to the second plane, being a plate having parallel planes with thickness of 't3'.

The first color light passes through the first modulating means, first color-light-combining means, astigmatism-correcting means and second color-light-combining means, and is provided to the projecting means to be projected on the screen. The second color-light passes through the second modulating means, reflects the back side of the first color-light-combining means, passes through the astigmatism-correcting means and second color-light-combining means, and is provided to the projecting means to be projected on the screen. The third color-light passes through the third modulating means, reflects the back side of the second color-light-combining means, and is provided to the projecting means to be projected on the screen. On the screen, a color image combining the first image by the first color-light, second image by the second color-light, and third image by the third color-light is displayed.

In this embodiment, for the color-light-modulating means, for example, light valves using a liquid crystal panel with transmission type or a liquid crystal panel with reflection type are used. For the light-combining means, for example, dichroic mirrors composed of inorganic matter such as glass and ceramics, or plastic materials and dichroic materials are used. For the astigmatism-correcting means, for example, plastic materials such as acrylic resin, or inorganic materials such as glass and ceramics are used.

According to this constitution, a first astigmatism occurs in the first image passing through the first color-light-combining means and in the second image passing through the second color-light-combining means. On the other hand, in the first and second images passing through the astigmatism-correcting means, a second astigmatism occurs in a direction orthogonal to the first astigmatism. The first astigmatism and second astigmatism cancel with each other corresponding to the thickness, and the astigmatism is reduced on the image displayed on the screen. In the third image, which only reflects the back side of the second color-light-combining means, astigmatism does not occur.

Therefore, the first image and second image having small astigmatism and the third image free from astigmatism are projected on the screen. As a result, a clear color image, having a small amount of color blurring, is displayed on the screen. At the same time, the projected image matched in focus and equal in the multiplying factor in longitudinal and lateral directions is obtained, and a projection type color image display device of further advanced picture quality is obtained.

Moreover, since the astigmatism-correcting means is placed on the plane orthogonal to the color-light-combining means, the size of the assembled projection type image display device can be reduced.

It is further possible to compose the astigmatism-correcting means and each color-light-combining means having a great thickness, and hence it is possible to compose the astigmatism-correcting means and color-light-combining means having a high surface precision, so that a more excellent clear color image may be obtained.

Still more, by injection molding and compression molding using plastics, the astigmatism-correcting means and color-light-combining means having a great thickness can be manufactured, and a more inexpensive image display device is obtained.

In the invention, the thickness 't3' of the astigmatism-correcting means is particularly desired to be greater than the thickness 't1' of the first color-light-combining means and thickness 't2' of the second color-light-combining means. In this constitution, the correction amount of astigmatism is larger, and a projection type image display device having further excellent effects may be obtained.

It is particularly preferred that the thickness 't3' of the astigmatism correcting means is larger than the thickness 't1' and 't2' of the color-light-combining means, and that the light incident angle 'b' into the astigmatism correcting means is smaller than the light incident angel 'a' into each color light combining means. When the light incident angle 'b' into the astigmatism-correcting means is small, the correction amount by the astigmatism-correcting means is smaller, but by increasing the thickness of the astigmatism-correcting means, the correction amount increases. Therefore, decrease of the correction amount due to light incident angle into the astigmatism-correcting means is canceled by the increase of the correction amount due to the thickness of the astigmatism-correcting means. As a result, the correction effect by the astigmatism-correcting means is maintained. In addition to these effects, since the light incident angle 'b' into the astigmatism-correcting means is small, the space for installing the astigmatism-correcting means is reduced, so that the size of the projection type image display device is reduced. In this constitution, the astigmatism-correcting means is disposed between the first color-light-combining means and second color-light-combining means. However, the astigmatism-correcting means may be disposed between the first color-light-combining means and the first light-modulating means. In such a constitution, the first color-light passes through the first modulating means, astigmatism-correcting means, first color-light-combining means and second color-light-combining means, and is provided to the projecting means to be projected on the screen. The second color-light passes through the second-modulating means, reflects the back side of the first color-light-combining means, passes through the second color-light-combining means, and is provided to the projecting means to be projected on the screen. The third color-light passes the back side of the second color-light combining-combining means and is provided to the projection means to be projected on the screen. In this constitution, too, although the effects are slightly inferior to those of the constitution in which the astigmatism-correcting means is disposed between the first color-light-combining means and second color-light-combining means, it has better effects than the prior art.

Figure 1:
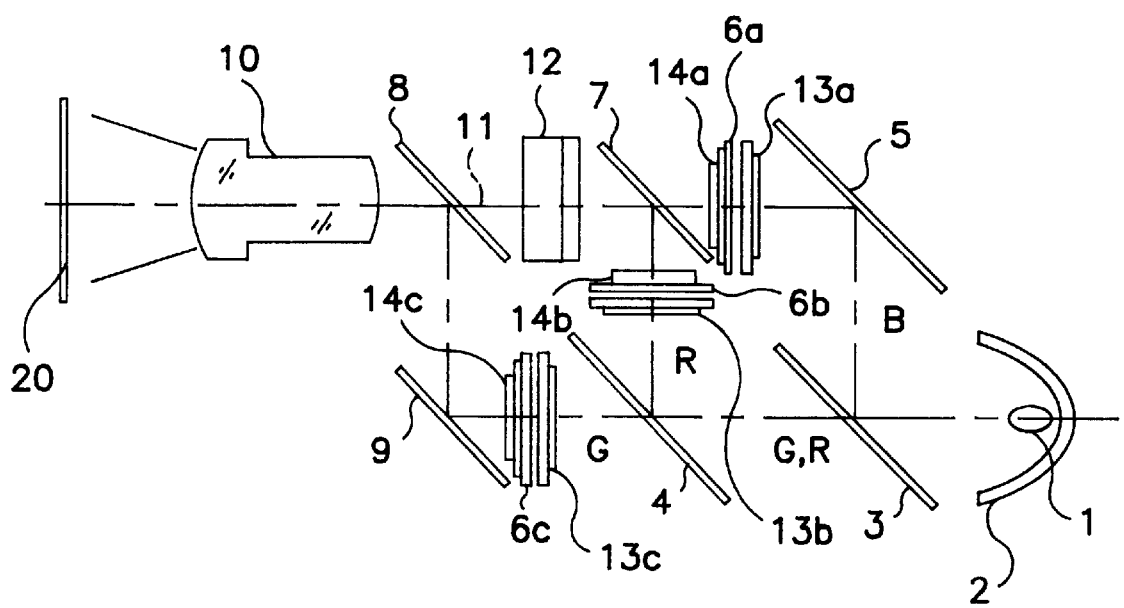
FIG. 1 is a top view showing a constitution of a projection type image display device in an embodiment of the invention.

Reference Numerals
1 Light source
2 Concave reflector
3 First light-separating dichroic mirror
4 Second light-separating dichroic mirror
5 First reflecting mirror
6a First liquid crystal panel with transmission type
6b Second liquid crystal panel with transmission type
6c Third liquid crystal panel with transmission type
7 First color-light-combining dichroic mirror
8 Second color-light-combining dichroic mirror
9 Second reflecting mirror
10 Projection lens
11 Optical axis
12 Astigmatism-correcting means
12a First incident side polarizer
12b Second incident side polarizer
12c Third incident side polarizer
13a First exit side polarizer
13b Second exit side polarizer
13c Third exit side polarizer
20 Screen
101 Light source
102 Reflector
103 First light-separating dichroic mirror
104 Second light-separating dichroic mirror
105 First reflecting mirror
106a First liquid crystal panel
106b Second liquid crystal panel
106c Third liquid crystal panel
107 First color-light-combining dichroic mirror
108 Second color-light-combining dichroic mirror
110 Projection lens
120 Screen

DETAILED DESCRIPTION OF THE PREFERRED EMBODIMENTS

Referring now to the drawings, preferred embodiments of the projection type image display device of the invention are described in detail below.

(Embodiment 1)

Figure 2:
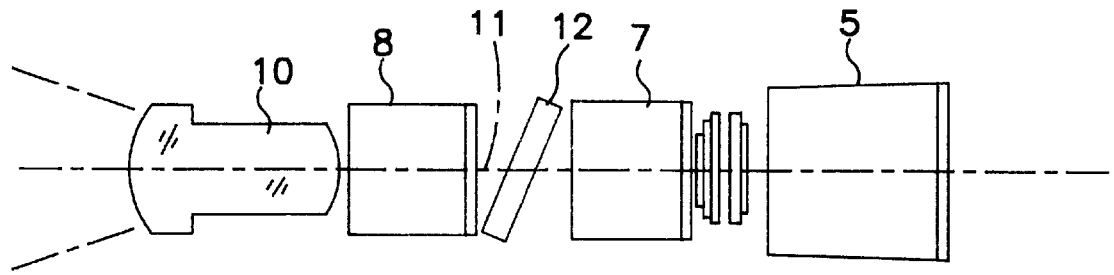
FIG. 2 is a side view of an essential composition of the projection type image display device shown in FIG. 1.

FIG. 1 is a top view showing a constitution of the projection type image display device of the invention, and FIG. 2 is a side view of essential parts of the projection type image display device shown in FIG. 1.

In FIG. 1, a light source 1 has a blue light which is a first color-light, a red light which is a second color-light, and a green light which is a third color-light. Behind the light source 1, a concave light reflector 2 is disposed, and the light emitted from the light source 1 is controlled into a unidirectional light by the light reflector 2.

In the direction of this unidirectional light, a first light-separating dichroic mirror 3 is disposed as a first light-separating means, on a first plane including the optical axis of the light, obliquely to the first plane. The first light-separating dichroic mirror 3 has a property of reflecting blue light and passing red light and green light. In the direction of red light and green light passing through the first light-separating dichroic mirror 3, there is a second light-separating dichroic mirror 4 which is a second light-separating means, disposed on the first plane including the optical axis, obliquely to the first plane. The second light-separating dichroic mirror 4 has a property of reflecting red light and passing green light. Thus, the light emitted from the light source 1 is separated into blue light, red light, and green light by the first light-separating dichroic mirror 3 and second light-separating dichroic mirror 4 as a light-separating means.

The blue light reflected by the first light-separating dichroic mirror 3 is reflected by a first reflector 5 disposed in the reflected direction, obliquely to the first plane. The reflected blue light enters first light-modulating means disposed in the reflected direction, orthogonal to the optical axis on the first plane. The first light-modulating means is a light valve composed of a first liquid crystal panel with transmission type 6a, a first incident side polarizer 13a disposed at the light incident side of the liquid crystal panel 6a, and a first exit side polarizer 14a disposed at the light exit side of the liquid crystal panel 6a.

First, the blue light reflector by the first reflector 5 is polarized into light having a wavelength limited in the oscillation direction by the first incident side polarizer 13a, and the polarized light enters the first liquid crystal panel 6a. The first liquid crystal panel 6a is composed of a plurality of independent picture elements, and each picture element can be controlled independently by an external signal. The light entering a picture element which is to be displayed in black passes through this picture element, and is absorbed consequently in the first exit side polarizer 14a. On the other hand, the light entering a picture element which is to be displayed in blue passes through this picture element without changing the oscillation direction of its wave, and consequently passes through the first exit side polarizer 14a. In this way, a blue light image is created in the first light-modulating means.

The red light reflected by the second light-separating dichroic mirror 4 enters the second light-modulating means disposed in the direction of the reflected light, orthogonal to the optical axis. The second light-modulating means is composed of a second liquid crystal panel with transmission type 6b, a second incident side polarizer 13b disposed at the light incident side of the second liquid crystal panel 6b, and a second exit side polarizer 14b disposed at the light exit side of the second liquid crystal panel 6b. The red light entering the second light-modulating means is modulated by the second light-modulating means, in the same manner as in the case of the blue light, and a red light image is created.

The green light passing through the second light-separating dichroic mirror 4 enters the third light-modulating means disposed in the direction of the transmitted light, orthogonal to the optical axis. The third light-modulating means is composed of a third liquid crystal panel with transmission type 6c, a third incident side polarizer 13c disposed at the light incident side of the third liquid crystal panel 6c, and a third exit side polarizer 14c disposed at the light exit side of the third liquid crystal panel 6c. The green light entering the third light-modulating means is modulated by the third light-modulating means, in the same manner as in the case of the blue light, and a green light image is created.

The incident side polarizers 13a, 13b, 13c transmit only the light having the waves limited in the oscillating direction, among the incident light. The exit side polarizers 14a, 14b, 14c is to limit the direction of polarization by passing only the light having the waves in the oscillating direction, having the axis of transmission distorted by 90 degrees to each incident side polarizer.

A first color-light-combining dichroic mirror 7 which is a first color-light-combining means is disposed in the direction of the light emitted from the first exit side polarizer 14a, on a first plane including its optical axis 11, obliquely at a light incident angle of 'a' to the first plane. At the same time, the first color-light-combining dichroic mirror 7 is disposed in the direction of the light emitted from the second exit side polarizer 14b, on a first plane including its optical axis 11, obliquely to the first plane. The optical axis 11 is an axis of an optical path linking the liquid crystal panels 6a, 6b, 6c, and a projection lens 10. The first color-light-combining dichroic mirror 7 is a plate with parallel planes having a refractive index 'N1' and a thickness 't1'.

The image of blue light created by the first light-modulating means passes through the first color-light-combining dichroic mirror 7, and the image of red light created by the second light-modulating means is reflected by the back side of the first color-light-combining dichroic mirror 7. In this way, the first color-light-combining dichroic mirror 7 is disposed so that the transmitted blue light and reflected red light may be the same in direction and in position. Thus, the first color-light-combining dichroic mirror 7 combines the blue light image and red light image.

The image of green light created by the third light-modulating means is reflected by a second reflector 9 disposed in the direction of the light and obliquely to its optical axis. The reflected green light is reflected by a second color-light-combining dichroic mirror 8 which is a second color-light-combining means.

The second color-light-combining dichroic mirror 8 is disposed in the direction of blue light and red light emitted from the first color-light-combining dichroic mirror 7, on a first plane including its optical axis, obliquely at a light incident angle of (a) to the first plane. At the same time, the second color-light-combining dichroic mirror 8 is disposed in the direction of the light reflected by the second reflector 9, obliquely to its first plane. The second color-light-combining dichroic mirror 8 is a plate of parallel planes having a refractive index 'N2' and a thickness 't2'. The images of blue light and red light pass through the second color-light-combining dichroic mirror 8, and the image of green light is reflected by the back side of the second color-light-combining dichroic mirror 8. The second color-light-combining dichroic mirror 8 is disposed so that the images of the transmitted blue light and red light and the image of the reflected green light may be the same in direction and position.

The images of the blue light and red light passing through the second color-light-combining dichroic mirror 8 and the image of the green light reflected by the mirror 8 are combined. The combined images are provided to the projection lens 10. The images of the colors provided to the projection lens 10 are projected on the screen 20. A color image combined from the blue light, red light and green light is displayed on the screen 20.

Astigmatism-correcting means 12 is disposed between the first color-light-combining dichroic mirror 7 and second color-light-combining dichroic mirror 8. The astigmatism-correcting means 12 comprises the optical axis 11 of the light emitted from the first color-light-combining dichroic mirror 7, and is disposed on a second plane orthogonal to the first plane, obliquely at a light incident angle of 'b' to the second plane. The astigmatism-correcting means 12 is a plate of parallel planes having a refractive index 'N3' and thickness 't3'.

To eliminate distortion in the image displayed on the screen 20, the first color-light-combining dichroic mirror 7, second color-light-combining dichroic mirror 8, second reflecting mirror 9, and astigmatism-correcting means 12 are machined to have a high surface precision.

In this constitution, the projection type image display device without astigmatism-correcting means 12 is described. In the projection type image display device without astigmatism-correcting means 12, an astigmatism proportional to the plate thickness of the second color-light-combining dichroic mirror 8 occurs in the image on the optical path of red light. Moreover, in the image on the optical path of blue light, an astigmatism proportional to the sum of the plate thickness of the first color-light-combining dichroic mirror 7 and plate thickness of the second color-light-combining dichroic mirror 8 occurs. However, no astigmatism occurs in the image on the optical path of green light. Therefore, the projected image of red light and blue light differs in the focal position in the longitudinal direction and lateral direction, and an off-focus blurry image is obtained on the screen 20, and a clear image is not obtained. Moreover, in the projected images of red light, blue light and green light on the screen 20, the longitudinal multiplying factor and lateral multiplying factor differ. Therefore, it is difficult to combine the three images of blue light, red light and green light by convergence adjustment, and the color image displayed on the screen 20 is blurry and cloudy in color, and a clear image is not obtained.

Figure 3A:
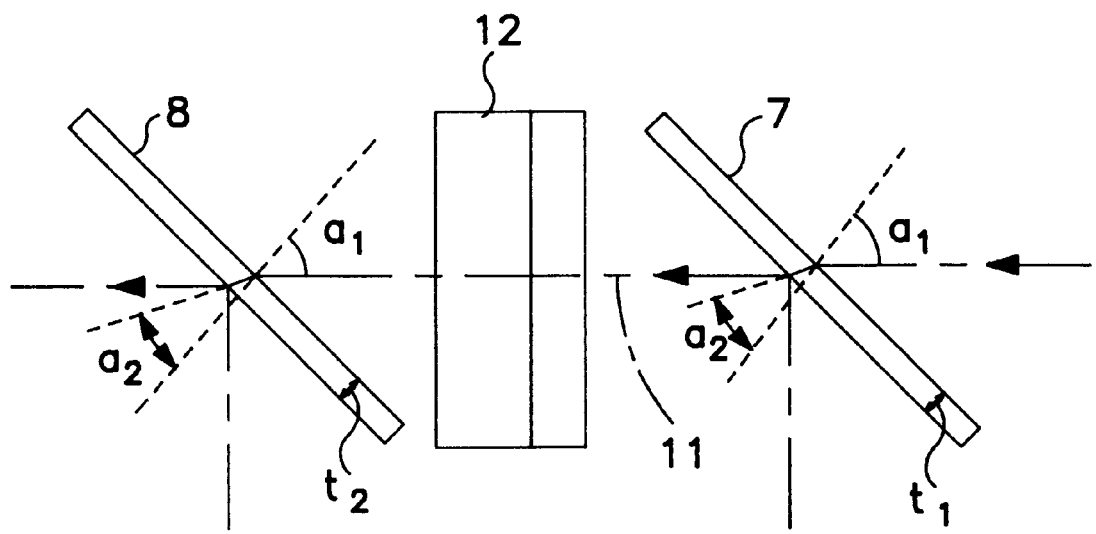
FIG. 3A is a top view of essential parts for explaining the astigmatism of the projection type image display device shown in FIG. 1.
Figure 3B:
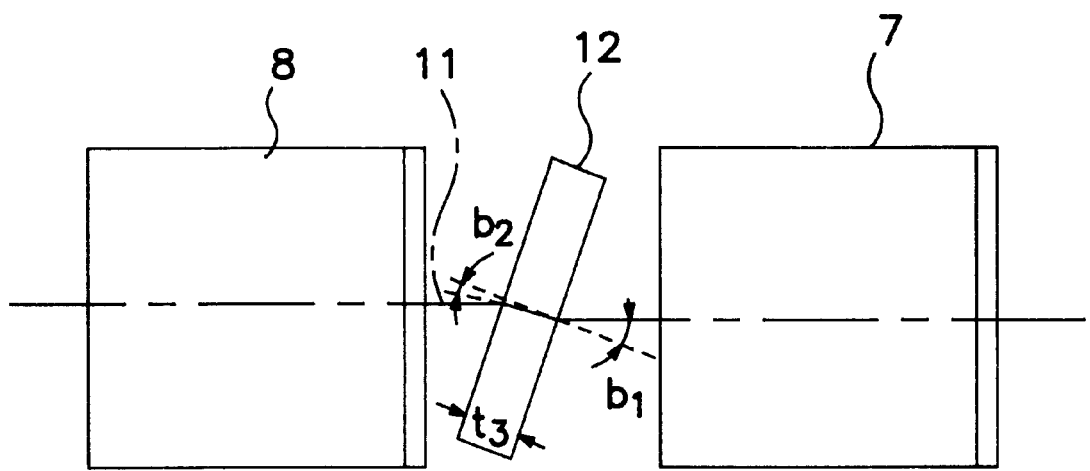
FIG. 3B is a side view of essential parts for explaining the astigmatism of the projection type image display device shown in FIG. 1.
Figure 4:
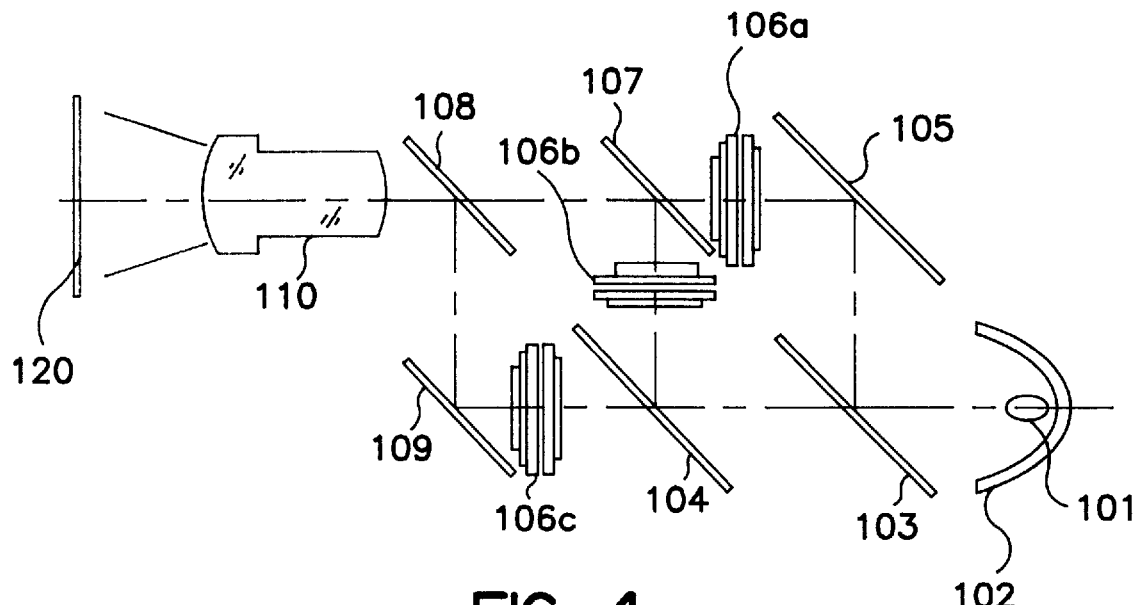
FIG. 4 is a top view showing a constitution of a conventional projection type image display device.
Figure 5:
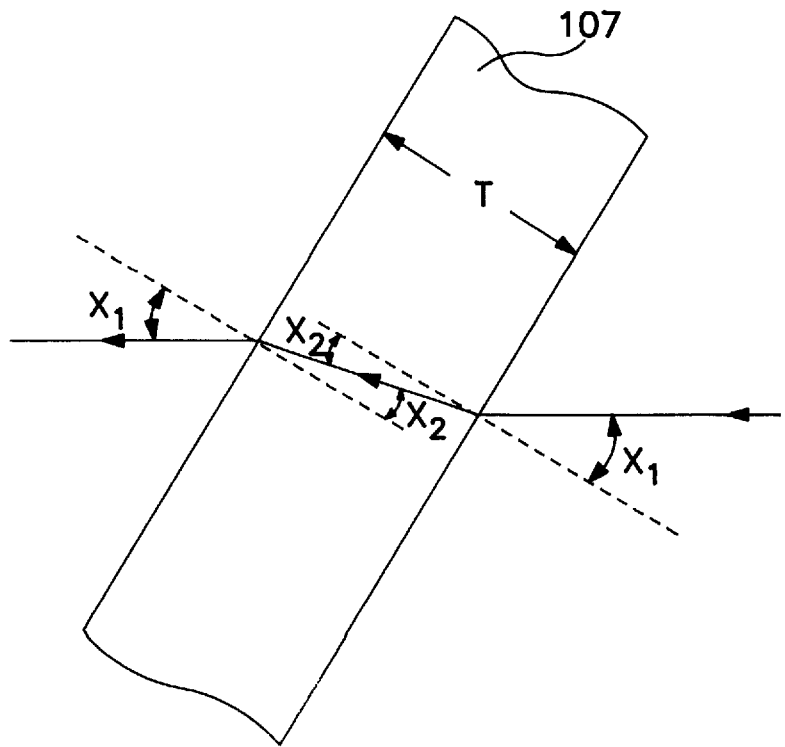
FIG. 5 is a magnified view of essential parts in FIG. 4, being a top view for explaining the principle of occurrence of astigmatism due to a color-light-combining dichroic mirror having a parallel plane plate shape.

By contrast, by installing the astigmatism-correcting means 12 of this embodiment, a clear image is obtained. The action and effect of the astigmatism-correcting means 12 are explained below by referring to FIG. 3A and FIG. 3B. FIG. 3A is a top view of the essential parts of the projection type image display device shown in FIG. 1, and FIG. 3B is its side view. In FIG. 3A and FIG. 3B, on the first plane including the optical axis 11, the first color-light-combining dichroic mirror 7 with thickness 't1', and the second color-light-combining dichroic mirror 8 with thickness 't2' are disposed obliquely at a light incident angle of 'a' to the first plane.

Between the first color-light-combining dichroic mirror 7 and second color-light-combining dichroic mirror 8, the astigmatism-correcting means 12 with thickness 't3' is disposed, orthogonal to the first plane, on a second plane including the optical axis, obliquely at a light incident angle of 'b' to the first plane. The thickness 't3' of the astigmatism-correcting means 12 is greater than the thickness 't1' of the first color-light-combining dichroic mirror 7 and the thickness 't2' of the second color-light-combining dichroic mirror 8.

The image of blue light emitted from the first light-modulating means enters the first color-light-combining dichroic mirror 7 at an angle 'a1'. The image of the entering blue light passes through the first color-light-combining dichroic mirror 7 at an angle of approach 'a2' corresponding to the refractive index 'N1', and leaves at an angle 'a1' to the first plane. At this time, in the image of the emitted blue light, astigmatism 'Y1'

$$\frac{t_1(1 - \cos^2(a_1)/\cos^2(a_2))}{(N_1 \cdot \cos(a_2))} = Y_1$$

occurs.

The image of the blue light leaving the first color-light-combining dichroic mirror 7 enters the astigmatism-correcting means 12 at an angle 'b1'. The image of the entering blue light passes through the astigmatism-correcting means 12 at an angle of approach 'b2' corresponding to the refractive index 'N3', and is emitted to the second plane at an angle 'b1'. At this time, in the image of the emitted blue light, astigmatism 'Y3'

$$\frac{t_3(1 - \cos^2(a_1)/\cos^2(a_2))}{(N_3 \cdot \cos(a_2))} = Y_3$$

occurs.

The image of the blue light leaving the astigmatism-correcting means 12 enters the second color-light-combining dichroic mirror 8 at an angle 'a1'. The image of the entering blue light passes through the second color-light-combining dichroic mirror 8 at an angle of approach 'b2' corresponding to the refractive index 'N2', and is emitted at an angle 'a1' to the first plane. At this time, in the image of the emitted blue light, astigmatism 'Y2'

$$\frac{t_3(1 - \cos^2(a_1)/\cos^2(a_2))}{(N_2 \cdot \cos(a_2))} = Y_2$$

occurs.

The image of the blue light leaving the second color-light-combining dichroic mirror 8 enters the projection lens 10, and is displayed on the screen 20. That is, the astigmatism of the image of the blue light displayed on the screen 20 is as follows.

$$Y1+Y2-Y3 \qquad (2)$$

The image of the red light reflected by the first color-light-combining dichroic mirror 7 enters the astigmatism-correcting means 12 at an angle 'b1'. The image of the incident red light passes through the astigmatism-correcting means 12 an at angle of approach 'b2' corresponding to the refractive index 'N3', and leaves at an angle 'b1' to the second plane. At this time, astigmatism 'Y3' occurs in the image of the emitted red light.

The image of the red light leaving the astigmatism-correcting means 12 enters the second color-light-combining dichroic mirror 8 at an angle 'a1'. The image of the entering red light passes through the second color-light-combining dichroic mirror 8 at an angle of approach 'a2' corresponding to the refractive index 'N2', and leaves at an angle 'a1' to the first plane. At this time, astigmatism 'Y2' occurs in the image of the emitted red light. The image of the red light leaving the second color-light-combining dichroic mirror 8 enters the projection lens 10 and is displayed on the screen 20.

That is, the astigmatism of the image of red light displayed on the screen 20 is as follows.

$$Y2-Y3 \qquad (3)$$

The image of the green light created by the third light-modulating means is reflected by the second reflecting mirror 9, and is further reflected by the back side of the second color-light-combining dichroic mirror 8, and enters the projection lens 10. That is, the image of the green light created by the third light-modulating means does not pass through any plate with parallel planes. Therefore, the image of the green light displayed on the screen 20 is free from astigmatism.

In the projection type color image display device for displaying a color image by combining images of colors, by disposing plates of parallel planes of a greater plate thickness than the plate thickness of the color-light-combining dichroic mirror in the optical paths of the color-lights generating astigmatism, the differences of astigmatism of the blue image, red image and green image can be decreased. As a result, cloudiness due to astigmatism can be decreased, so that a clearer image may be obtained.

(EXAMPLE 1 AND COMPARISON 1)

In the constitution of the projection type image display device without astigmatism-correcting means, supposing:

thickness 't1' of first color-light-combining dichroic mirror 7 to be 2 mm, refractive index 'N1' of first color-light-combining dichroic mirror 7 to be 1.52, installation angle (a) of first color-light-combining dichroic mirror 7 to be 45 degrees, thickness 't2' of second color-light-combining dichroic mirror 8 to be 2 mm, refractive index 'N2' of second color-light-combining dichroic mirror 8 to be 1.52, and installation angle 'a' of second color-light-combining dichroic mirror 8 to be 45 degrees, then:

the astigmatism of the blue light image is 1.076 mm, the astigmatism of the red light image is 0.538 mm, and the astigmatism of the green light image is 0 mm.

That is, the maximum difference among images is 1.076 mm.

By contrast, in the constitution with astigmatism-correcting means 12 of parallel plane plate, supposing:

the thickness of astigmatism-correcting means 12 is greater than the thickness of the color-light-combining dichroic mirror, and the installation angle of astigmatism-correcting means 12 is smaller than the installation angle of the color-light-combining dichroic mirror, that is, thickness 't3' of astigmatism-correcting means 12 is 7.3 mm, refractive index 'N3' of astigmatism-correcting means 12 is 1.49, and installation angle 'b' of astigmatism-correcting means 12 is 30 degrees, then the correction value of astigmatism by astigmatism-correcting means 12 is 0.805 mm.

Therefore, the astigmatism of the blue light image is 0.271 mm, the astigmatism of the red light image is −0.267 mm, and the astigmatism of the green light image is 0 mm.

That is, the maximum difference among images is 0.538 mm.

Thus, by installing the astigmatism-correcting means 12 of parallel plane plate in which the thickness of astigmatism-correcting means is greater than the thickness of the color-light-combining dichroic mirror, and the installation angle of the astigmatism-correcting means is smaller than the installation angle of the color-light-combining dichroic mirror, the astigmatism of the images of blue light and red light can be notably decreased. Therefore, the difference in astigmatism of the images of blue light, red light and green light projected on the screen is decreased. As a result, in the color image displayed on the screen, the occurrence of blurry color and cloudiness is decreased, and a clear color image is obtained.

(EXAMPLE 2)

When the installation angle of the astigmatism-correcting means 12 is smaller than the installation angle of the color-light-combining dichroic mirror, and the thickness of the astigmatism-correcting means 12 is nearly the same as the thickness of the color-light-combining dichroic mirror (in the astigmatism-correcting means of which thickness is smaller than the thickness of the color-light-combining dichroic mirror, it is hard to obtain high precision on the parallel planes due to its manufacturing process, and hence the thickness of the astigmatism-correcting means is set nearly the same as the thickness of the color-light-combining dichroic mirror), for example, instead of the example illustrated above, if the thickness of the astigmatism-correcting means is 2.0 mm, the correction value of astigmatism by the astigmatism-correcting means 12 is 0.221.

Therefore, the astigmatism of the blue light image is 0.855 mm, the astigmatism of the red light image is 0.317 mm, and the astigmatism of the green light image is 0 mm.

That is, the maximum difference among images is 1.172 mm, and hence the maximum difference among images is decreased by installation of the astigmatism-correcting means.

(Embodiment 2)

In the projection type image display device of this embodiment, the astigmatism-correcting means 12 is disposed between the first light-modulating means and first color-light-combining means, same as in Embodiment 1. In the constitution of the embodiment, the astigmatism of the images of color-lights is as follows. That is, the astigmatism of the blue light image is 0.217 mm, the astigmatism of the red light image is 0.538 mm, and the astigmatism of the green light image is 0 mm.

That is, the maximum difference among images is 0.809 mm.

In the constitution in Embodiment 2, by installation of the astigmatism-correcting means 12, the astigmatism of the image of blue light can be decreased. Therefore, the difference in astigmatism of the images of blue light, red light and green light projected on the screen is decreased. As a result, in the color image displayed on the screen, the occurrence of blurry color and cloudiness is decreased, and a clear color image is obtained.

As described herein, when the light passes through the color-light-combining dichroic mirror of parallel plane shape disposed obliquely on the optical path, the imaging position on the first plane parallel to the incident light and transmitted light including the optical axis is deviated from the imaging position on the second plane orthogonal to the first plane and including the optical axis, so that astigmatism occurs.

In the invention, when the astigmatism-correcting means of parallel plane shape is installed on the second plane, astigmatism 'Y1, Y2' due to the color-light-combining dichroic mirror of parallel plane shape and astigmatism 'Y3' due to the astigmatism-correcting means of parallel plane shape occur, but since the astigmatism 'Y3' occurs in a direction orthogonal to the astigmatism 'Y1, Y2', the astigmatism 'Y3' and astigmatism 'Y1, Y2' cancel each other. Therefore, vagueness of the image due to astigmatism 'Y1, Y2' caused by the color-light-combining dichroic mirrors is reduced.

In particular, by installing the astigmatism-correcting means having parallel planes between the first color-light-modulating means and projecting means, on the second plane including the optical axis, with the thickness of the astigmatism-correcting means greater than the thickness of the light-color-combining dichroic mirrors, the correction amount of astigmatism is larger. Therefore, the difference of astigmatism among images of color-lights is much smaller, so that a superior clear color image may be obtained.

What is particularly preferred is a constitution in which the thickness of the astigmatism-correcting means is greater than the thickness of the color-light-combining dichroic mirrors and the light incident angle into the astigmatism-correcting means is smaller than the light incident angle into the color-light-combining dichroic mirrors. That is, when the light incident angle into the astigmatism-correcting means is small, the correction amount by the astigmatism-correcting means is small, but by increasing the thickness of the astigmatism-correcting means, the correction amount increases. Therefore, the decrease of correction amount due to the light incident angle into the astigmatism-correcting means is canceled by the correction amount due to the thickness of the astigmatism-correcting means. As a result, the space for installing the astigmatism-correcting means is saved, and the size of the projection type image display device is reduced.

(By contrast, when the light incident angle into the astigmatism-correcting means is large, although the correction amount by the astigmatism-correcting means increases, it requires a wider space for installing the astigmatism-correcting means and the size of the projection type image display device increases.)

Simultaneously with the above effects, the difference in astigmatism of the images of blue light, red light and green light projected on the screen is decreased. As a result, in the color image displayed on the screen, the occurrence of blurry color and cloudiness is decreased, and a clear color image is obtained.

Moreover, because the astigmatism-correcting means and color-light-combining means are plates of parallel planes having relatively large thickness, plates of parallel planes having a high precision may be easily obtained. Besides, the astigmatism-correcting means of parallel plane shape of high precision having a relatively large thickness can be easily obtained by molding, such as injection molding and compression molding, by using plastic materials. Therefore, the cost can be reduced. In addition, since the astigmatism-correcting means is installed on the plane orthogonal to the color-light-combining means, the size of the assembled projection type image display means is small and compact.

In the invention, other various modified examples are possible. For example, for the light-modulating means, instead of the liquid crystal panel, components capable of controlling the optical path by electric signal can be used.

Depending on the optical paths of the images of color lights, a plurality of astigmatism correction means can be placed at optimum positions.

Moreover, for the color-light-combining, means, instead of the color-light-combining dichroic mirrors, filters for transmitting, cutting off or reflecting the light selectively depending on the wavelength can be used.

As the light-separating means, instead of the two light-separating dichroic mirrors, a combination of an arbitrary number can be used, or filters for controlling selectively the wavelength of light can be used.

Depending on the optical paths of images of color-lights, an arbitrary number of color light-combining means can be placed at optimum positions.

Hence, modifications existing in the true spirit and scope of the invention are all included in the scope of the claims.

What is claimed:

1. A projection type color image display device comprising:
    (a) light-source for emitting a light having a first color-light, a second color-light, and a third color-light,
    (b) light-separating means for separating the light emitted from the light source into the first color-light, the second color-light, and the third color-light,
    (c) first modulating means for modulating the first color-light into a first image-light, second modulating means for modulating the second color-light into a second image-light, and third modulating means for modulating the third color-light into a third image-light,
    (d) first color-light-combining means having a function of transmitting the first image-light and reflecting the second image-light,
    (e) second color-light-combining means having a function of transmitting the first image-light and the second image-light combined by the first color-light-combining means and reflecting the third image-light,
    (f) astigmatism-correcting means located between said first color-light combining means and said second color light combining means, and
    (g) projecting means for projecting the first image-light, the second image-light, and the third-light on a screen,
    wherein the first color-light-combining means and the second color-light-combining means are disposed along an optical axis linking the first modulating means and the projecting means, and
    the astigmatism-correcting means is disposed along the optical axis, and between the first light combining means and the second light combining means.

2. A projection type color image display device of claim 1, wherein each shape of the astigmatism-correcting means, the first color-light-combining means and the second color-light-combining means is a parallel plane shape, and
    a thickness of the astigmatism-correcting means is greater than each thickness of the first color-light-combining means and the second color-light-combining means.

3. A projection type color image display device of claim 1, wherein each shape of the astigmatism-correcting means, the first color-light-combining means, and the second color-light-combining means is a parallel plane shape, and a light incident angle into the astigmatism-correcting means is smaller than each light incident angle into the first color-light-combining means and the second color-light-combining means.

4. A projection type color image display device comprising:

(a) light-source for emitting a light having a first color-light, a second color-light, and a third color-light, (b) light-separating means for separating the light emitted from the light source into the first color-light, the second color-light, and the third color-light, (c) first modulating means for modulating the first color-light into a first image-light, second modulating means for modulating the second color-light into a second image-light, and third modulating means for modulating the third color-light into a third image-light, (d) first color-light-combining means of a parallel plane shape having a function of transmitting the first image-light and reflecting the second image-light, (e) second color-light-combining means of a parallel plane shape having a function of transmitting the first image-light and the second image-light combined by the first color-light-combining means and reflecting the third image-light, (f) astigmatism-correcting means of a parallel plane shape located between said first color-light combining means and said second color light combining means, and (g) projecting means for projecting the first image-light, the second image-light, and the third image-light on a screen, wherein the first color-light-combining means and the second color-light-combining means are disposed along an optical axis linking the first modulating means and the projecting means, the astigmatism-correcting means is disposed on a second plane orthogonal to the first plane including the optical axis, obliquely to the second plane, a thickness of the astigmatism-correcting means is greater than each thickness of the first color-light-combining means and the second color-light-combining means, and a light incident angle into the astigmatism-correcting means is smaller than each light incident angle into the first color-light-combining means and the second color-light-combining means.

5. A projection type color image display device of claim 4, wherein the astigmatism-correcting means is positioned between the first color-light-combining means and the second color-light-combining means.

6. A projection type color image display device of claim 4, wherein the first color-light-combining means is first dichroic mirror containing a dichroic coat, and the second color-light-combining means is second dichroic mirror containing a dichroic coat.

7. A projection type color image display device of claim 4, wherein the means for modulating is composed of a liquid crystal panel.

8. A projection type color image display device of claim 4, wherein the astigmatism-correcting means is manufactured by a method of molding by using plastic materials.

9. A projection type color image display device comprising:

(a) light-source for emitting a light having a first color-light, a second color-light, and a third color-light, (b) a light-separating means for separating the light emitted from the light source into the first color-light, the second color-light, and the third color-light, (c) means for modulating composed of a first modulating means for modulating means for modulating the first color-light into a first image-light, a second modulating means for modulating the second color-light into a second image-light, and a third modulating means for modulating the third color-light into a third image-light, (d) first color-light-combining means of a parallel plane shape having a function of transmitting the first image-light and reflecting the second image-light, (e) second color-light-combining means of a parallel plane shape having a function of transmitting the first image-light and the second image-light combined by the first color-light-combining means and reflecting the third image-light, (f) astigmatism-correcting means of a parallel plane shape located between said first color-light combining means and said second color light combining means, and (g) projecting means for projecting the first image-light, the second image-light, and the third image-light on a screen, wherein the first color-light-combining means and the second color-light-combining means are disposed on a first plane including an optical axis linking the first modulating means and the projecting means, obliquely to the first plane, the astigmatism-correcting means is disposed on a second plane orthogonal to the first plane including the optical axis, obliquely to the second plane, a thickness of the astigmatism-correcting means is greater than each thickness of the first color-light-combining means and the second color-light-combining means, a light incident angle into the astigmatism-correcting means is smaller than each light incident angle into the first color-light-combining means and the second color-light-combining means, and wherein a thickness of the astigmatism-correcting means is smaller than each thickness of the first color-light combining means and the second color-light combining means.

10. A projection type color image display device of claim 9, wherein the astigmatism-correcting means is positioned between the first color-light-combining means and the second color-light-combining means.

11. A projection type color image display device of claim 9, wherein the first color-light-combining means is first dichroic mirror containing a dichroic coat, and the second color-light-combing means is second dichroic mirror containing a dichroic coat.

12. A projection type color image display device of claim 9, wherein the means for modulating is composed of a liquid crystal panel.

13. A projection type color image display device of claim 9, wherein the astigmatism-correcting means is manufactured by a method of molding by using plastic materials.

14. A projection type color image display device of claim 9, wherein the astigmatism-correcting means cancels the astigmatism of the first image-light, the second image-light and the third image-light.

* * * * *

UNITED STATES PATENT AND TRADE MARK OFFICE
CERTIFICATE OF CORRECTION

PATENT NO. : 5,907,373
DATED : May 25, 1999
INVENTOR(S) : Yamagishi

It is certified that error appears in the above-identified patent and that said Letters Patent is hereby corrected as shown below:

Cover page, item [56] U.S. Patent Documents, "4,827,334  5/1989 John et al." should be --4,827,334  5/1989 Johnson et al.--.

Signed and Sealed this

Twenty-third Day of May, 2000

Attest:

Q. TODD DICKINSON

*Attesting Officer*         *Director of Patents and Trademarks*